（12）United States Patent
Huang et al.

(10) Patent No.: US 11,077,339 B1
(45) Date of Patent: Aug. 3, 2021

(54) GOLF BALL

(71) Applicant: SCANNA CO., LTD., Tainan (TW)

(72) Inventors: Hsi-Chou Huang, Tainan (TW);
Li-Ying Huang, Tainan (TW)

(73) Assignee: SCANNA CO., LTD., Tainan (TW)

( * ) Notice: Subject to any disclaimer, the term of this patent is extended or adjusted under 35 U.S.C. 154(b) by 0 days.

(21) Appl. No.: 16/930,868

(22) Filed: Jul. 16, 2020

(30) Foreign Application Priority Data

Apr. 8, 2020 (TW) .................................. 109111788

(51) Int. Cl.
| | |
|---|---|
| *A63B 37/06* | (2006.01) |
| *A63B 37/00* | (2006.01) |
| *C08K 3/32* | (2006.01) |
| *B32B 25/16* | (2006.01) |
| *B32B 25/08* | (2006.01) |
| *B32B 27/40* | (2006.01) |
| *C08K 5/375* | (2006.01) |

(52) U.S. Cl.
CPC ...... *A63B 37/0051* (2013.01); *A63B 37/0039* (2013.01); *A63B 37/0074* (2013.01); *A63B 37/0075* (2013.01); *A63B 37/0076* (2013.01); *B32B 25/08* (2013.01); *B32B 25/16* (2013.01); *B32B 27/40* (2013.01); *C08K 3/32* (2013.01); *C08K 5/375* (2013.01); *C08K 2003/321* (2013.01)

(58) Field of Classification Search
CPC .................................................... A63B 37/0051
USPC ........................................................ 473/370
See application file for complete search history.

(56) References Cited

U.S. PATENT DOCUMENTS

2009/0124757 A1* 5/2009 Shindo ..................... C08L 21/00
525/193
2009/0264220 A1* 10/2009 Shindo ............... A63B 37/0003
473/376

\* cited by examiner

*Primary Examiner* — Raeann Gorden

(57) ABSTRACT

A golf ball includes a core unit and a cover unit enclosing the core unit. The core unit is made from a rubber composition which includes a rubber material, a halogenated organosulfur compound, and a phosphorus-containing material. The phosphorus-containing material is selected from the group consisting of metal phosphate, polyphosphate, polyphosphoric ester, phosphonate, phosphate-modified polyester, and combinations thereof. The cover unit is made from a thermoplastic polyurethane composition.

15 Claims, 5 Drawing Sheets

GOLF BALL

CROSS-REFERENCE TO RELATED APPLICATION

This application claims priority of Taiwanese Invention Patent Application No. 109111788, filed on Apr. 8, 2020.

FIELD

The disclosure relates to a golf ball, and more particularly to a golf ball including a thermoplastic polyurethane-based cover.

BACKGROUND

A conventional multi-layered golf ball generally includes a core, an intermediate layer, and a cover layer. The core is made of, for example, rubber. The intermediate layer is made of, for example, an ionomer. The cover layer is made of, for example, a thermoplastic polyurethane or a Surlyn resin. Compared to a golf ball including a cover layer made of the Surlyn resin, a golf ball including a cover layer made of the thermoplastic polyurethane would enable a golfer to have a better control of striking the golf ball, so as to produce a good shot feeling. However, such golf ball does not have an ideal coefficient of restitution, and thus, those in the industry would increase the thicknesses of the core and the intermediate layer of such golf ball so as to increase the coefficient of restitution. However, the durability of the golf ball might be deteriorated accordingly.

U.S. patent application publication No. 2019/0344125 A1 discloses a golf ball which includes a core layer and an outer cover layer. The core layer is made from a rubber composition including a polybutadiene rubber. A halogenated organo-sulfur compound or a salt thereof (for example, zinc pentachlorothiophenol (ZnPCTP)) might be added to the rubber composition. The outer cover layer is made from a thermoplastic polyurethane composition. While such publication shows that the softness and the elasticity of the core layer of the golf ball might be enhanced by addition of the halogenated organo-sulfur compound, the durability of the golf ball might not be increased effectively.

Therefore, there is still a need to develop a golf ball having improved durability.

SUMMARY

Therefore, an object of the disclosure is to provide a golf ball having good elasticity and superior durability while providing a golfer with good shot feeling.

According to the disclosure, there is provided a golf ball which includes a core unit and a cover unit enclosing the core unit. The core unit is made from a rubber composition which includes a rubber material, a halogenated organo-sulfur compound, and a phosphorus-containing material. The phosphorus-containing material is selected from the group consisting of metal phosphate, polyphosphate, polyphosphoric ester, phosphonate, phosphate-modified polyester, and combinations thereof. The cover unit is made from a thermoplastic polyurethane composition.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
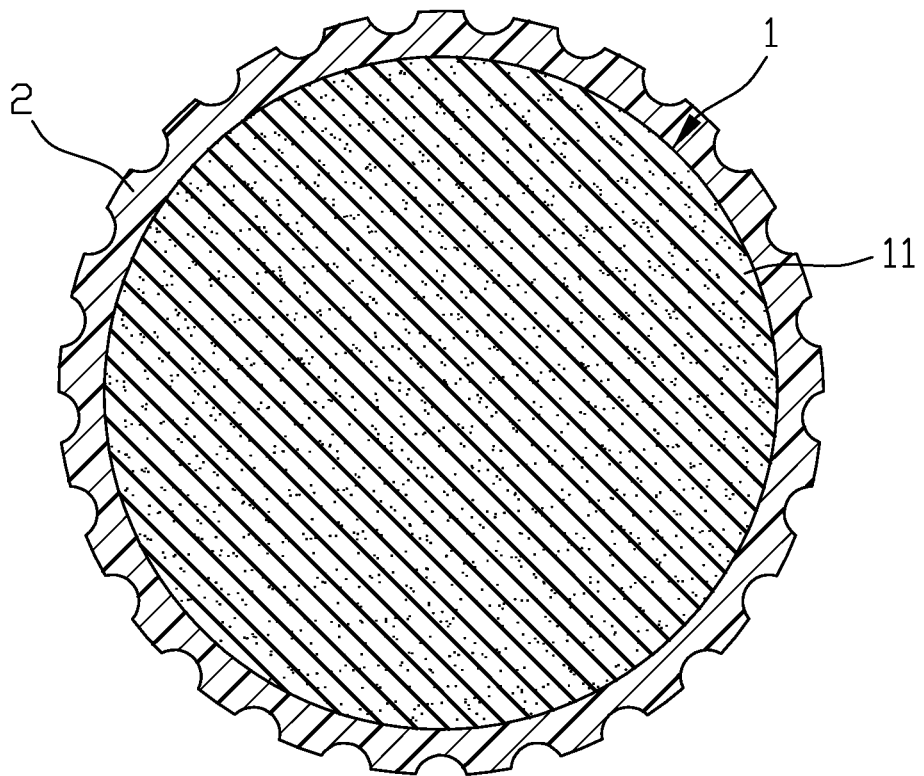
FIG. 1 is a schematic sectional view of a first embodiment of a golf ball according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

In certain embodiments, a golf ball according to the disclosure includes a core unit and a cover unit enclosing the core unit.

In certain embodiments, the golf ball according to the disclosure further includes an intermediate layer unit which is disposed between the core unit and the cover unit and which encloses the core unit.

The core unit is made from a rubber composition which includes a rubber material, a halogenated organo-sulfur compound, and a first phosphorus-containing material.

Since the rubber composition of the core unit includes both the halogenated organo-sulfur compound and the first phosphorus-containing material, the golf ball of the disclosure including the core unit has the following advantages.

(1) The golf ball of the disclosure has a low compression value, such that a golfer may have a good shot feeling while striking the golf ball.

(2) The golf ball of the disclosure has a high coefficient of restitution, and thus has good elasticity, such that the golf ball of the disclosure may have a traveling distance which is greater than that of a conventional golf ball under the same striking conditions.

(3) The golf ball of the disclosure has a relatively high strength and good durability, such that a golfer can strike the golf ball with higher power without adversely affecting the golf ball.

There is no limitation to the rubber material. Any natural rubber or synthetic rubber commonly used for making the golf ball is suitable as the rubber material. Examples of the synthetic rubber may include, but are not limited to, butadiene rubber, styrene butadiene rubber, nitrile butadiene rubber, and combinations thereof.

In certain embodiments, the halogenated organo-sulfur compound is selected from the group consisting of 2-chlorothiophenol, 3-chlorothiophenol, 4-chlorothiophenol, pentachlorothiophenol, a salt of pentachlorothiophenol, and combinations thereof. A non-limiting example of the salt of pentachlorothiophenol is zinc pentachlorothiophenol.

In certain embodiments, the halogenated organo-sulfur compound in the rubber composition is present in an amount of at least 0.3 part by weight based on 100 parts by weight of the rubber material, so as to provide the golf ball with a lower compression value, a higher coefficient of restitution, and a higher strength. In certain embodiments, the halogenated organo-sulfur compound in the rubber composition is in an amount ranging from 0.3 part by weight to 0.8 part by weight based on 100 parts by weight of the rubber material.

The first phosphorus-containing material is selected from the group consisting of metal phosphate, polyphosphate, polyphosphoric ester, phosphonate, phosphate-modified polyester, and combinations thereof.

In certain embodiments, the first phosphorus-containing material in the rubber composition is present in an amount of at least 0.3 part by weight based on 100 parts by weight of the rubber material, so as to provide the golf ball with a lower compression value, a higher coefficient of restitution, and a higher strength. In certain embodiments, the first phosphorus-containing material in the rubber composition is present in an amount ranging from 0.3 part by weight to 0.8 part by weight based on 100 parts by weight of the rubber material.

The cover unit is made from a thermoplastic polyurethane composition that includes a thermoplastic polyurethane. There is no limitation to the thermoplastic polyurethane. Any thermoplastic polyurethane commonly used for making a golf ball is suitable for the golf ball of the disclosure. Examples of the thermoplastic polyurethane may include, but are not limited to, a polyether-type thermoplastic polyurethane, polyester-type thermoplastic polyurethane, a MDI-based (methylenediphenyl diisocyanate-based) thermoplastic polyurethane, and combinations thereof.

The intermediate layer unit is made from an ionomer composition which includes an ionomer. There is no limitation to the ionomer. Any ionomer commonly used for making a golf ball is suitable for the golf ball of the disclosure. A non-limiting example of the ionomer is Surlyn resin that is commercially available from DuPont Company.

In certain embodiment, the ionomer composition further includes a second phosphorus-containing material so as to provide the golf ball with a superior tightness between the core unit and the intermediate layer unit, and thus with a lower compression value, a higher coefficient of restitution, and a higher strength. The second phosphorus-containing material is selected from the group consisting of metal phosphate, polyphosphate, polyphosphoric ester, phosphonate, phosphate-modified polyester, and combinations thereof.

In certain embodiments, the second phosphorus-containing material in the ionomer composition is present in an amount of at least 0.3 part by weight based on 100 parts by weight of the ionomer. In certain embodiments, the second phosphorus-containing material in the ionomer composition is present in an amount ranging from 0.3 part by weight to 0.8 part by weight based on 100 parts by weight of the ionomer.

Referring to FIG. 1, a first embodiment of the golf ball according to the disclosure includes a core unit 1 and a cover unit 2 enclosing the core unit 1. The core unit 1 includes a center core 11. The center core 11 is made from the rubber composition as described above.

The first embodiment of the golf ball according to the disclosure may be made, for example, by hot-press molding the rubber composition at a temperature ranging, for example, from 150° C. to 170° C., and a pressure ranging, for example, from 180 kg to 200 kg, to form the center core 11, followed by injection molding the thermoplastic polyurethane composition at a temperature of, for example, 210° C. to form the cover unit 2.

Figure 2:
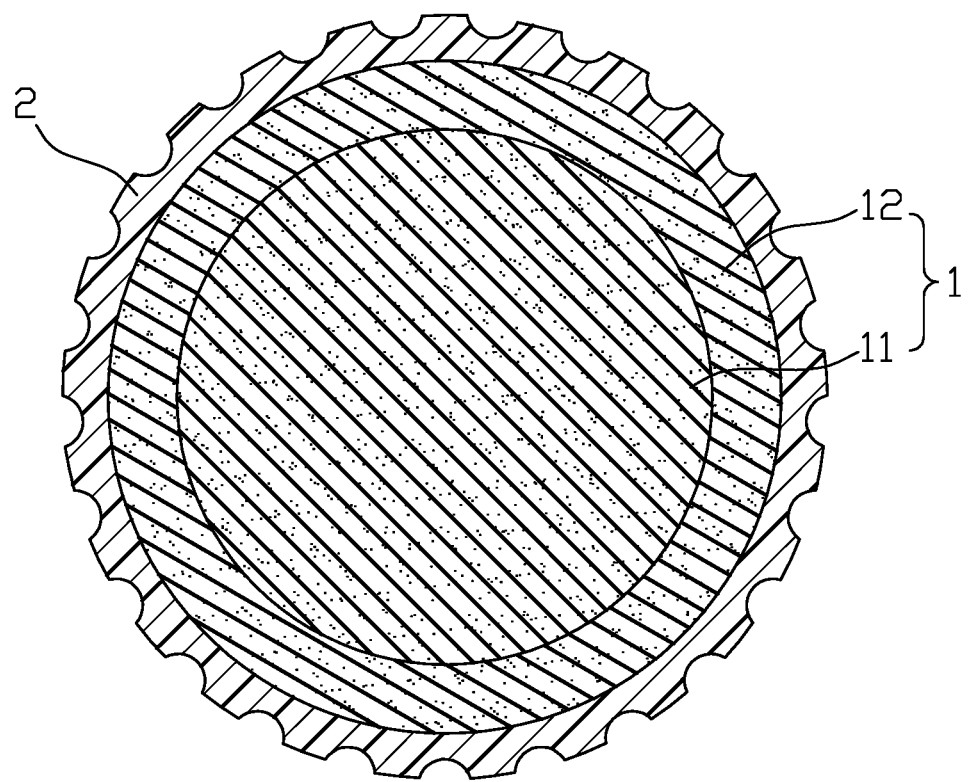
FIG. 2 is a schematic sectional view of a second embodiment of the golf ball according to the disclosure.

Referring to FIG. 2, a second embodiment of the golf ball according to the disclosure is similar to the first embodiment except that in the second embodiment, the core unit 1 further includes a core layer 12 which encloses the center core 11. At least one of the center core 11 and the core layer 12 is made from the rubber composition. In certain embodiments, both of the center core 11 and the core layer 12 are made from the rubber composition.

The second embodiment of the golf ball according to the disclosure may be made by a process similar to that for making the first embodiment except that in the second embodiment, the core layer 12 is further made by hot-press molding the rubber composition at a temperature ranging, for example, from 150° C. to 170° C., and a pressure ranging, for example, from 180 kg to 200 kg.

Figure 3:
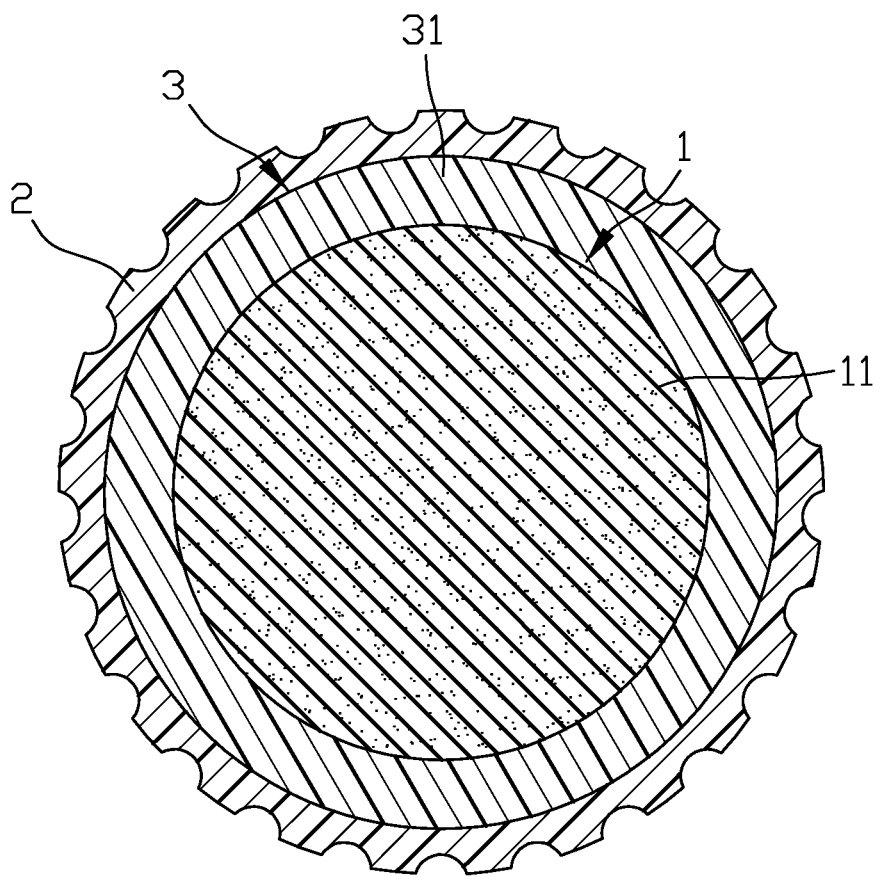
FIG. 3 is a schematic sectional view of a third embodiment of the golf ball according to the disclosure.

Referring to FIG. 3, a third embodiment of the golf ball according to the disclosure is similar to the first embodiment except that in the third embodiment, an intermediate layer unit 3 is further included to be disposed between the core unit 1 and the cover unit 2 so as to enclose the core unit 1. Specifically, the intermediate layer unit 3 includes an inner intermediate layer 31 enclosing the core unit 1. The inner intermediate layer 31 is made from the ionomer composition as described above.

The third embodiment of the golf ball according to the disclosure may be made by a process similar to that for making the first embodiment except that the inner intermediate layer 31 is further made by injection molding the ionomer composition at a temperature, for example, of 210° C.

Figure 4:
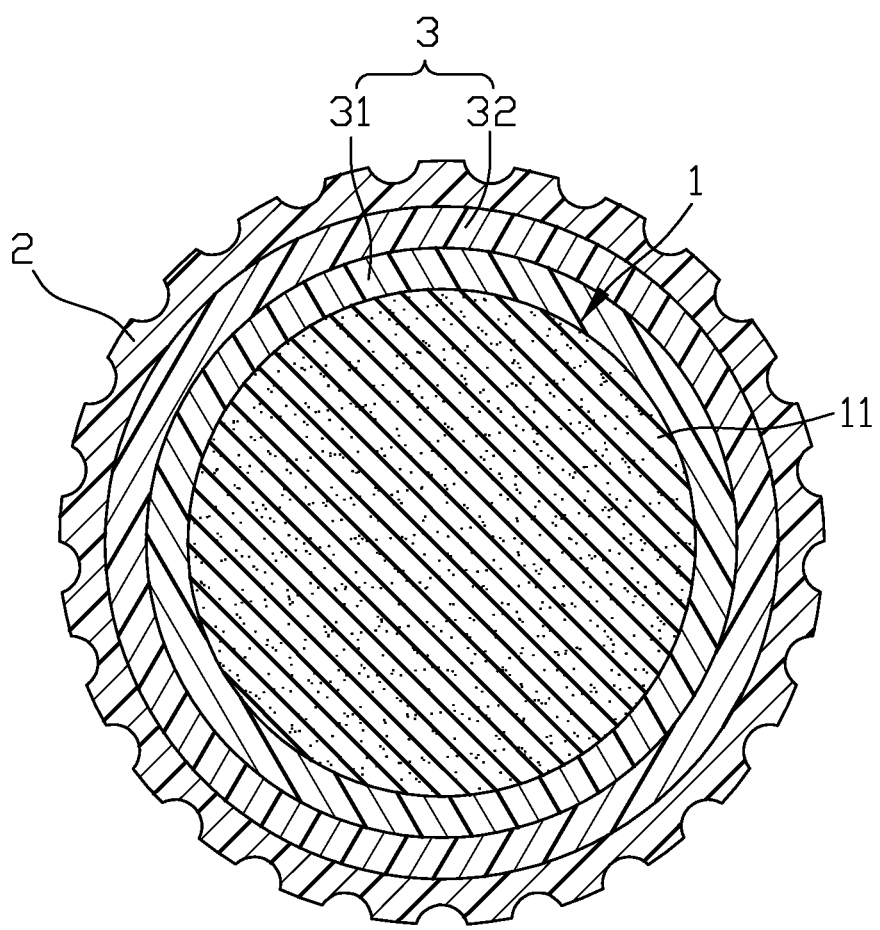
FIG. 4 is a schematic sectional view of a fourth embodiment of the golf ball according to the disclosure.

Referring to FIG. 4, a fourth embodiment of the golf ball according to the disclosure is similar to the third embodiment except that in the fourth embodiment, the intermediate layer unit 3 further includes an outer intermediate layer 32 which encloses the inner intermediate layer 31. The inner intermediate layer 31 is made from the ionomer composition as described above. At least one of the inner and outer intermediate layers 31, 32 is made from the ionomer composition. In certain embodiments, both of the inner and outer intermediate layers 31, 32 are made from the ionomer composition.

The fourth embodiment of the golf ball according to the disclosure may be made by a process similar to that for making the third embodiment except that the outer intermediate layer 32 is further made by injection molding the ionomer composition at a temperature, for example, of 210° C.

Figure 5:
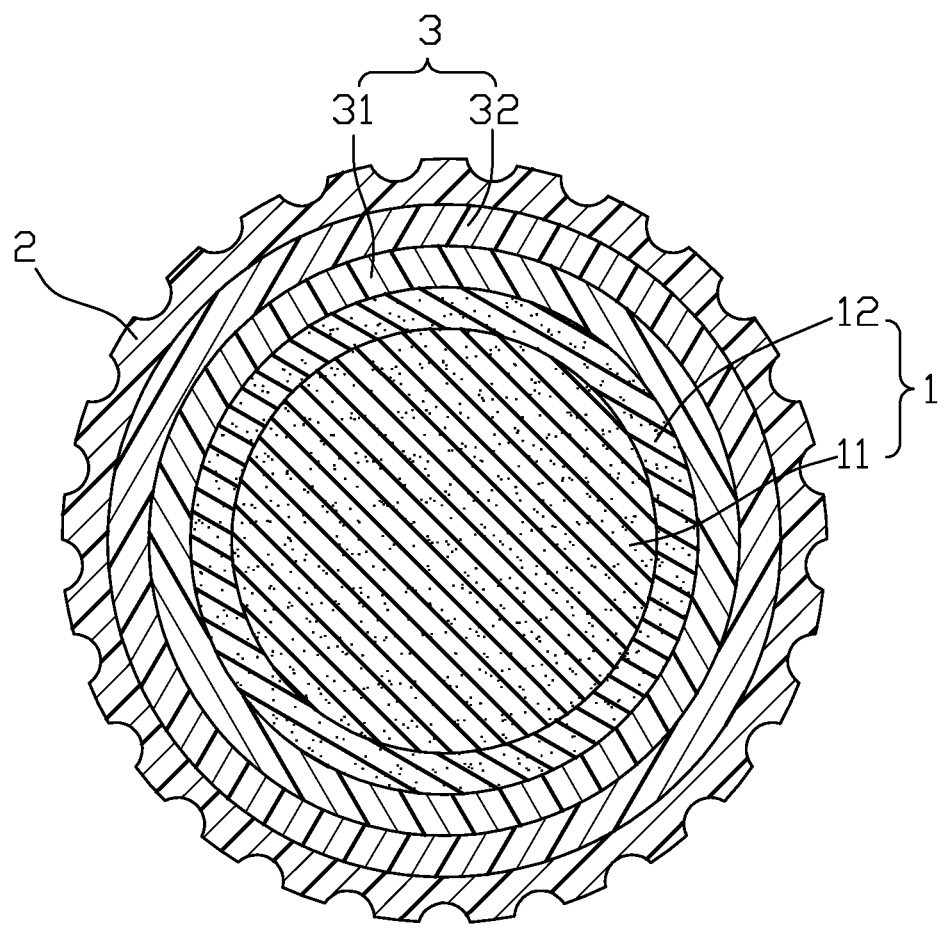
FIG. 5 is a schematic sectional view of a fifth embodiment of the golf ball according to the disclosure.

Referring to FIG. 5, a fifth embodiment of the golf ball according to the disclosure is similar to the fourth embodiment except that in the fifth embodiment, the core unit 1 further includes the core layer 12 enclosing the center core 11. At least one of the center core 11 and the core layer 12 is made from the rubber composition. In certain embodiments, both of the center core 11 and the core layer 12 are made from the rubber composition.

The fifth embodiment of the golf ball according to the disclosure may be made by a process similar to that for making the fourth embodiment except that in the fifth embodiment, the core layer 12 is further made by hot-press molding the rubber composition at a temperature ranging, for example, from 150° C. to 170° C., and a pressure ranging, for example, from 180 kg to 200 kg.

In each of the first to the fifth embodiments described above, there is no limitation on the size of the core unit 1, and the thicknesses of the intermediate layer unit 3 and the cover unit 2.

When the core unit 1 only includes the center core 11, the core unit 1 may have a diameter ranging, for example, from 39.6 mm to 40.4 mm. When the core unit 1 includes the center core 11 and the core layer 12, the core unit 1 may have a diameter ranging, for example, from 35.0 mm to 38.0 mm, and the center core 11 may have a diameter ranging, for example, from 10.0 mm to 30.0 mm.

When the intermediate layer unit 3 only includes the inner intermediate layer 31, the intermediate layer unit 3 may have a thickness ranging, for example, from 1.6 mm to 2.4 mm. When the intermediate layer unit 3 includes the inner intermediate layer 31 and the outer intermediate layer 32, the intermediate layer unit 3 may have a thickness ranging, for example, from 1.6 mm to 2.4 mm, the inner intermediate layer 31 may have a thickness ranging, for example, from 0.8 mm to 1.2 mm, and the outer intermediate layer 32 may have a thickness ranging, for example, from 0.8 mm to 1.2 mm.

The cover unit 2 may have a thickness ranging, for example, from 0.3 mm to 1.5 mm.

Examples of the disclosure will be described hereinafter. It is to be understood that these examples are exemplary and explanatory and should not be construed as a limitation to the disclosure.

Preparative Example 1: Manufacturing a Core Unit

A rubber composition, which included 100 parts by weight (referred to as pbw hereinafter) of butadiene rubber (commercially available from Chi Mei Corporation, Model No.: PR-050), 0.3 pbw of zinc pentachlorothiophenol, and 0.3 pbw of polyphosphate, was subjected to a first hot-pressing molding process at a temperature ranging from 150° C. to 170° C. and a pressure ranging from 180 kg to 200 kg to forma center core (diameter: 25 mm). The same rubber composition for forming the center core was subjected to a second hot-pressing molding process at a temperature ranging from 150° C. to 170° C. and a pressure ranging from 180 kg to 200 kg to forma core layer enclosing the center core, so as to form a core unit (diameter: 36 mm).

Preparative Examples 2 and 3 and Comparative Preparative Example 1: Manufacturing Core Units Preparative Examples 2 and 3 and Comparative Preparative Example 1 were made by procedures similar to those of Preparative Example 1 except that the rubber compositions shown in Table 1 were used.

Example A1: Manufacturing a Practice Golf Ball

A rubber composition, which included 100 pbw of butadiene rubber (commercially available from Chi Mei Corporation, Model No.: PR-050), 0.5 pbw of zinc pentachlorothiophenol, and 0.5 pbw of polyphosphate, was subjected to a hot-pressing molding process at a temperature ranging from 160° C. to 170° C. and a pressure ranging from 180 kg to 200 kg to form a core unit (diameter: 29.8 mm).

100 pbw of thermoplastic polyurethane was subjected to an injection molding process at a temperature of 210° C. to forma cover unit (thickness: 1.5 mm) enclosing the core unit, so as to obtain a practice golf ball having a configuration schematically illustrated in FIG. 1.

Comparative Example A1

A commercial practice golf ball (Manufacturer: Bridgestone Corporation, Model No.: TPU RANGE BALL) was used, which has a configuration schematically illustrated in FIG. 1, and which has a core unit made of rubber and a cover unit made of thermoplastic polyurethane.

Comparative Examples A2, A3, and A4

Comparative Examples A2, A3, and A4 were made by procedures similar to those of Example A1 except that the rubber compositions shown in Table 2 were used.

Example B1: Manufacturing a Game Golf Ball

A rubber composition, which includes 100 pbw of butadiene rubber (commercially available from Chi Mei Corporation, Model No.: PR-050), 0.5 pbw of zinc pentachlorothiophenol, and 0.5 pbw of polyphosphate, was subjected to a first hot-pressing molding process at a temperature ranging from 150° C. to 170° C. and a pressure ranging from 180 kg to 200 kg to forma center core (diameter: 25 mm). The same rubber composition for forming the center core was subjected to a second hot-pressing molding process at a temperature ranging from 150° C. to 170° C. and a pressure ranging from 180 kg to 200 kg to forma core layer enclosing the center core, so as to form a core unit (diameter: 36 mm).

An ionomer composition, which includes 100 pbw of an ionomer (Manufacturer: DuPont Corporation, Model No.: HPF series) and 0.5 pbw of polyphosphate, was subjected to a first injection molding process at a temperature of 210° C. to form an inner intermediate layer (thickness: 1.2 mm) enclosing the core unit. The same ionomer composition for forming the inner intermediate layer was subjected to a second injection molding process at a temperature of 210° C. to form an outer intermediate layer (thickness: 1.2 mm) enclosing the inner intermediate layer, so as to form an intermediate layer unit (diameter: 2.4 mm).

100 pbw of thermoplastic polyurethane was subjected to an injection molding process at a temperature of 210° C. to form a cover unit (thickness: 1 mm) enclosing the intermediate layer unit, so as to obtain a game golf ball having a configuration schematically illustrated in FIG. 5.

Comparative Examples B2, B3, and B4

Comparative Examples B2, B3, and B4 were made by the procedures similar to those of Example B1 except that the rubber compositions and the ionomer compositions shown in Table 3 were used.

Comparative Example B1

A commercial game golf ball (Manufacturer: TaylorMade Golf Company, Model No.: TP5) was used, which has a configuration schematically illustrated in FIG. 5, and which has a core unit made of rubber, an intermediate layer unit made of an ionomer, and a cover unit made of thermoplastic polyurethane.

Evaluations:

1. Compression Value:

Compression value of each of the core units of the aforesaid preparative examples and comparative preparative example and the compression value of each of the golf balls of the aforesaid examples and comparative examples were measured using built-in testing modes of a compression tester (Manufacturer: Automated Design Corporation, Model No.: ADC).

2. Coefficient of Restitution (COR)

Coefficient of restitution of each of the core units of the aforesaid preparative examples and comparative preparative example and the coefficient of restitution of each of the golf balls of the aforesaid examples and comparative examples were measured at a bat speed of 160 ft/sec using built-in testing modes of a bat tester (Manufacturer: Automated Design Corp., Model No.: COR & Durability system).

3. Number of Hitting (Durability):

The number of hitting of each of the core units of the aforesaid preparative examples and comparative preparative example and the number of hitting of each of the golf balls of the aforesaid examples and comparative examples was measured at a bat speed of 160 ft/sec using built-in testing modes of the bat tester.

4. JIS-D Hardness

JIS-D hardness of each of the golf balls of the aforesaid examples and comparative examples was measured using a JIS-D harness tester (Manufacturer: Teclock Corporation, Model No.: GS-702G Type-D).

5. Strength:

Strength of each of the core units of the aforesaid preparative examples and comparative preparative example was measured at a bat speed of 160 ft/sec using built-in testing modes of the bat tester.

The evaluation results are shown in Tables 1 to 3 below.

TABLE 1

| Core unit (pbw) | | | Preparative Example | | | Comparative Preparative Example |
|---|---|---|---|---|---|---|
| | | | 1 | 2 | 3 | 1 |
| Core unit | Center core | Butadiene rubber | 100 | 100 | 100 | 100 |
| | | ZnPCTP* | 0.3 | 0.5 | 0.8 | 0 |
| | | Polyphosphate | 0.3 | 0.5 | 0.8 | 0 |
| | Core layer | BR | 100 | 100 | 100 | 100 |
| | | ZnPCTP | 0.3 | 0.5 | 0.8 | 0 |
| | | Polyphosphate | 0.3 | 0.5 | 0.8 | 0 |
| Evaluation | Compression value | | 60 | 55 | 55 | 62 |
| | Coefficient of restitution | | 0.800 | 0.812 | 0.812 | 0.798 |
| | Number of hitting (times) | | 70 | 80 | 80 | 60 |
| | Strength (kg) | | 1600 | 2000 | 2000 | 1500 |

*ZnPCTP: zinc pentachlorothiophenol

TABLE 2

| Practice golf ball (pbw) | | | Example A1 | Comparative Example | | | |
|---|---|---|---|---|---|---|---|
| | | | | A1 | A2 | A3 | A4 |
| Core unit | Center core | Butadiene rubber | 100 | — | 100 | 100 | 100 |
| | | ZnPCTP* | 0.5 | — | 0 | 0.5 | 0 |
| | | Polyphosphate | 0.5 | — | 0 | 0 | 0.5 |
| Cover unit | | TPU** | 100 | — | 100 | 100 | 100 |
| Evaluation | Compression value | | 80 | 90 | 88 | 80 | 88 |
| | Coefficient of restitution | | 0.740 | 0.725 | 0.730 | 0.734 | 0.731 |
| | JIS-D hardness | | 56 | 67 | 56 | 56 | 56 |
| | Number of hitting (times) | | 600 | 500 | 500 | 500 | 500 |

*ZnPCTP: zinc pentachlorothiophenol
**TPU: thermoplastic polyurethane

TABLE 3

| Game golf ball (pbw) | | | Example B1 | Comparative Example | | | |
|---|---|---|---|---|---|---|---|
| | | | | B1 | B2 | B3 | B4 |
| Core unit | Center core | Butadiene rubber | 100 | — | 100 | 100 | 100 |
| | | ZnPCTP* | 0.5 | — | 0 | 0.5 | 0 |
| | | Polyphosphate | 0.5 | — | 0 | 0 | 0.5 |
| | Core layer | Butadiene rubber | 100 | — | 100 | 100 | 100 |
| | | ZnPCTP | 0.5 | — | 0 | 0.5 | 0 |
| | | Polyphosphate | 0.5 | — | 0 | 0 | 0.5 |
| Intermediate layer unit | Inner intermediate layer | Ionomer | 100 | — | 100 | 100 | 100 |
| | | Polyphosphate | 0.5 | — | 0 | 0 | 0.5 |
| | Outer intermediate layer | Ionomer | 100 | — | 100 | 100 | 100 |
| | | Polyphosphate | 0.5 | — | 0 | 0 | 0.5 |
| Cover unit | | TPU** | 100 | 100 | 100 | 100 | 100 |
| Evaluation | Compression value | | 88 | 95 | 95 | 89 | 95 |
| | Coefficient of restitution | | 0.756 | 0.750 | 0.748 | 0.750 | 0.749 |
| | JIS-D hardness | | 60 | 65 | 60 | 60 | 60 |
| | Number of hitting (times) | | 150 | 120 | 120 | 120 | 120 |

*ZnPCTP: zinc pentachlorothiophenol
**TPU: thermoplastic polyurethane

As shown in Table 1, each of the core units of Preparative Examples 1 to 3, in which a rubber composition including zinc pentachlorothiophenol and polyphosphate was used for manufacturing the core units, has a lower compression value, a higher coefficient of restitution, a greater strength, and a greater number of hitting as compared to those of the core unit of Comparative Preparative Example 1.

As shown in Table 2, the practice golf ball of Example A1, in which a rubber composition including zinc pentachlorothiophenol and polyphosphate was used for manufacturing the core unit, has a lower compression value, a higher coefficient of restitution, and a greater number of hitting as compared to those of the practice golf balls of Comparative Examples A1, A2, A3, and A4.

As shown in Table 3, the game golf ball of Example B1, in which a rubber composition including zinc pentachlorothiophenol and polyphosphate was used for manufacturing the core unit and an ionomer composition including an ionomer and polyphosphate was used for manufacturing the intermediate unit, has a lower compression value, a higher coefficient of restitution, and a greater number of hitting as compared to those of the game golf balls of Comparative Examples B1, B2, B3, and B4.

In view of the aforesaid, the core unit of the golf ball of the disclosure is made from a rubber composition that includes a halogenated organo-sulfur compound and a phosphorus-containing material, such that the golf ball of the disclosure has a lower compression value, a higher coefficient of restitution, and a greater number of hitting. In addition, the intermediate layer unit of the golf ball of the disclosure is made from an ionomer composition that includes a phosphorus-containing material, such that the golf ball of the disclosure has a lower compression value, a higher coefficient of restitution, and a greater number of hitting.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A golf ball, comprising:
   a core unit made from a rubber composition which includes
      a rubber material,
      a halogenated organo-sulfur compound, and
      a first phosphorus-containing material selected from the group consisting of metal phosphate, polyphosphate, polyphosphoric ester, phosphonate, phosphate-modified polyester, and combinations thereof; and
   a cover unit enclosing said core unit and made from a thermoplastic polyurethane composition,
   wherein in said rubber composition, said first phosphorus-containing material is present in an amount of at least 0.3 part by weight based on 100 parts by weight of said rubber material.

2. The golf ball according to claim 1, wherein in said rubber composition, said halogenated organo-sulfur compound is present in an amount of at least 0.3 part by weight based on 100 parts by weight of said rubber material.

3. The golf ball according to claim 1, wherein in said rubber composition, said halogenated organo-sulfur compound is selected from the group consisting of 2-chlorothiophenol, 3-chlorothiophenol, 4-chlorothiophenol, pentachlorothiophenol, a salt of pentachlorothiophenol, and combinations thereof.

4. The golf ball according to claim 1, further comprising an intermediate layer unit which is disposed between said core unit and said cover unit and which encloses said core unit, said intermediate layer unit being made from an ionomer composition which includes an ionomer.

5. The golf ball according to claim 4, wherein said ionomer composition further includes a second phosphorus-containing material selected from the group consisting of metal phosphate, polyphosphate, polyphosphoric ester, phosphonate, phosphate-modified polyester, and combinations thereof.

6. The golf ball according to claim 5, wherein in said ionomer composition, said second phosphorus-containing material is present in an amount of at least 0.3 part by weight based on 100 parts by weight of said ionomer.

7. The golf ball according to claim 5, wherein said intermediate layer unit has an inner intermediate layer which encloses said core unit, and an outer intermediate layer enclosing said inner intermediate layer, at least one of said inner and outer intermediated layers being made from said ionomer composition.

8. The golf ball according to claim 1, wherein said core unit has a center core and a core layer which encloses said center core, at least one of said center core and said core layer being made from said rubber composition.

9. A golf ball, comprising:
   a core unit made from a rubber composition which includes
      a rubber material,
      a halogenated organo-sulfur compound, and
      a first phosphorus-containing material selected from the group consisting of metal phosphate, polyphosphate, polyphosphoric ester, phosphonate, phosphate-modified polyester, and combinations thereof;
   a cover unit enclosing said core unit and made from a thermoplastic polyurethane composition; and
   an intermediate layer unit disposed between said core unit and said cover unit and encloses said core unit, said intermediate layer unit being made from an ionomer composition which includes an ionomer,
   wherein said ionomer composition further includes a second phosphorus-containing material selected from the group consisting of metal phosphate, polyphosphate, polyphosphoric ester, phosphonate, phosphate-modified polyester, and combinations thereof.

10. The golf ball according to claim 9, wherein in said rubber composition, said first phosphorus-containing material is present in an amount of at least 0.3 part by weight based on 100 parts by weight of said rubber material.

11. The golf ball according to claim 9, wherein in said rubber composition, said halogenated organo-sulfur compound is present in an amount of at least 0.3 part by weight based on 100 parts by weight of said rubber material.

12. The golf ball according to claim 9, wherein in said rubber composition, said halogenated organo-sulfur compound is selected from the group consisting of 2-chlorothiophenol, 3-chlorothiophenol, 4-chlorothiophenol, pentachlorothiophenol, a salt of pentachlorothiophenol, and combinations thereof.

13. The golf ball according to claim 9, wherein in said ionomer composition, said second phosphorus-containing material is present in an amount of at least 0.3 part by weight based on 100 parts by weight of said ionomer.

14. The golf ball according to claim 9, wherein said intermediate layer unit has an inner intermediate layer which encloses said core unit, and an outer intermediate layer enclosing said inner intermediate layer, at least one of said inner and outer intermediated layers being made from said ionomer composition.

15. The golf ball according to claim 9, wherein said core unit has a center core and a core layer which encloses said center core, at least one of said center core and said core layer being made from said rubber composition.

* * * * *